United States Patent Office 2,697,663
Patented Dec. 21, 1954

2,697,663

INFANT FEEDING COMPOSITIONS

Rudolph Michael Tomarelli, Lansing, John Byron Hassinen and Gerald Thomas Durbin, Mason, and Finn Westelius Bernhart, Holt, Mich., assignors, by mesne assignments, to American Home Products Corporation, New York, N. Y., a corporation of Delaware No Drawing. Application April 19, 1952,
Serial No. 283,244

9 Claims. (Cl. 99—54)

This invention relates to food products and, more particularly, to food products which are suitable for use in the feeding of infants.

Our invention is more especially concerned with certain new and improved food compositions which contain the usual fat, protein, carbohydrate, fatty acid, amino acid, vitamin and mineral constituents necessary for growth of the infant, but which compositions also contain, in addition, a specific factor or principle necessary to support the growth of the microorganism *Lactobacillus bifidus* as the predominant microorganism in the digestive tract of the infant fed therewith.

There are a number of commercially available food compositions utilized for the feeding of infants which are based on cow's milk as an essential and important nutritive constituent thereof. These compositions generally contain, in addition to added vitamins, a fat constituent, milk protein, an edible sugar (frequently lactose), minerals, and ash. The relative proportion of these constituents is such as to provide a nutritive formula meeting all the nutritional requirements of the infant when an aqueous solution of a specified concentration is prepared and fed to the infant.

As an example, one well-known commercially available infant feeding formula, derived from cow's milk but having major physical and chemical properties essentially the same as human milk, contains approximately 1.5% of protein, 7.0% of carbohydrate, 3.5% of fat, 0.38% of ash and a mineral constituent, such as iron, present in a relatively minor amount as, for example, approximately 0.0005%, as the food is made up as a liquid ready to feed to the infant. Such a composition is, in many respects, similar to human milk, will supply approximately 20 calories per fluid ounce and contains of course, in addition, various vitamin constituents, such as vitamin A, thiamin, riboflavin, vitamin C, vitamin D and niacin, all present (with the exception of vitamin C) in amounts considerably in excess of the amounts in which those vitamins are present in an equal volume of human or breast milk.

It should be understood, of course, that the particular commercial food composition having the foregoing analysis is but one of many available infant feeding formulas, all based on, or derived from, cow's milk, which compositions are usually supplied, either in a concentrated liquid form which is adapted to be diluted with water before use, or as a solid powder or granular composition which is dissolved in water in specified proportions to provide solutions of specified concentrations. Such compositions will vary to some extent from each other in the ingredients utilized, i. e., the source of the fat present therein, the content of saturated and unsaturated fatty acids and amino acids, the carbohydrate constituents, the relative proportions of the ingredients, etc., but they are essentially similar in that all are derived from the milk of cows. While some of these commercially available infant food compositions are similar in their major physical and chemical properties and in greater or less degree to human or breast milk as supplied to a nursling by the lactating mother, there are certain important differences in the predominating microorganisms present in the intestinal bacterial flora characteristic of an infant fed exclusively on human or breast milk, as compared with the intestinal flora of an infant fed with one of the commercial food formulas based on, or derived from, cow's milk.

The intestinal flora of the breast fed infant is characterized by the presence therein of the microorganism *Lactobacillus bifidus* as the predominating microorganism. The stools of infants fed exclusively with human milk are in fact characterized by the presence of this microorganism as constituting almost the entire bacterial flora therein.

As seen in smears when freshly isolated from the infant feces, the *L. bifidus* organism comprises gram-positive, straight or curved rods that are non-motile and that do not form spores. One or both ends may appear to be split longitudinally to give the effect of two short branches, this appearance leading to the term "bifid." One end of the organism may be bulbous or racket-shaped.

While this microorganism predominates in the intestinal tract and feces of infants fed with human or mother's milk, it is not the characteristic or predominating microorganism in the intestinal tract of infants fed with other foods, such as cow's milk or with the commercially available food preparations derived from, or based on, cow's milk. Infants so fed show a less uniform intestinal flora with an appreciable proportion of gram-negative rods and cocci.

The fact that a stable *L. bifidus* flora is characteristic only of the intestinal tract of breast-fed infants is now fully understood and appreciated by pediatricians and other specialists in the medical, biological, and nutritional sciences. See, for example, the publications of Tissier, Comptes rendus soc. biol., 51, pages 943–945; and 60, pages 359, 361; and Ann inst. Pasteur, 19, pages 109–123; and 22, pages 189–207. See also the papers of Moro; Wien, klin, Wochschr.; 13, pages 114–115, and Jahrb. Kinderheilk., 61, pages 676–734; and 61, pages 870–899. That the original observations of Tissier concerning the predominance of *L. bifidus* in nurslings' stool have been amply confirmed is pointed out in the more recent publication of Norris, Flanders, Tomarelli and György in the Journal of Bacteriligy, 60, pages 681–696 (December, 1950).

Medical authorities are now in general agreement that many of the advantages which a breast-fed infant seems to have, in so far as its nutrition and resistance to certain diseases are concerned, are attributable, at least in part, to the predominance of *L. bifidus* in his intestinal tract. The prevalence of this organism in the intestinal tract is now believed to be of physiological significance, and its growth may prevent intestinal disorders caused by other bacteria. Resistance to bacterial intestinal diseases, and even to parenteral disorders, such as respiratory infections, is typical of breast-fed infants. Infants who are bottle-fed with the milk of cows and other animals, or with infant feeding formulas utilizing cow's milk as the source of protein, are definitely more susceptible to such disorders. In this connection see the article of Robinson in "Lancet," entitled: "Infant Morbidity and Mortality," vol. CCLX, page 788 (April 7, 1951).

In the infant colon in which a stable *L. bifidus* flora is lacking, it is now generally believed that the infant is more likely to suffer from disorders attributable to the growth of other bacterial some of which are harmful to the infant, since competition for the available food supply in the infant intestinal tract where *L. bifidus* flourishes reduces the possibility that other bacteria, particularly the harmful *B coli*, may grow in considerable numbers or in extensive colonies.

In any event, where the gram-positive bacillus *L. bifidus* is present in large numbers in the infant intestine, which is now found only when the infant is breast-fed, there is considerably less growth of other microorganisms, particularly of the gram-negative *B. coli*, the Clostridia, and of certain air-born microorganisms such as the Sarcinae bacteria. While the reasons for the superior resistance to disease of breast-fed infants as compared with infants who are fed on cow's milk, or on the usual infant formulas in which cow's milk is a principal constituent, are not fully understood, pediatricians are generally agreed that in some measure, at least, the superior resistance is attributable to the presence of an extensive *L. bifidus* flora in the intestines of nurslings, this bacterium being absent in any considerable numbers from the intestines of infants who are not fed with human milk. Interest in the isolation and determination of the growth requirements of *L. bifidus* has therefore been stimulated by its apparently unique predominance in the intestinal tract of the breast-fed infant.

Extensive work has been carried out on the identification and isolation of the active biological principle which is responsible for promoting the growth of L. bifidus in the intestines of infants who are nourished with human milk, which active principle is evidently not present in sufficient amount to insure the growth of L. bifidus as the predominant microorganism in the intestinal tract of infants who are fed with cow's milk, or with any of the usual feeding compositions or infant formulas based on cow's milk. This work has demonstrated that the growth promoting factor is also present in cow's milk as well as in human milk, but it is present in cow's milk in such small amounts as to be insufficient to supply to infants fed with cow's milk enough of the growth promoting factor for L. bifidus to cause that organism to predominate in the intestinal bacterial flora of the infant.

While the concentration of the growth promoting factor for L. bifidus in cow's milk varies to some extent with various samples of milk, and to some extent with the particular strain or variety of the L. bifidus microorganism which is selected for the test, ordinarily the growth promoting factor is present in cow's milk only in about $\frac{1}{30}$ the concentration (approximately 3.33%) in which it is present in human or breast milk. In this concentration it is evidently present in too small an amount to insure that L. bifidus will be the predominating microorganism in the intestinal flora of infants fed with cow's milk. It should be noted that only about one-half of the solid content of the commercial infant food preparation of which the analysis is given above is cow's milk, and the L. bifidus growth promoting factor is present in such an infant food formula only to the extent of approximately $\frac{1}{60}$ (approximately 1.67%) of the amount in which it is present in an equal volume of human milk.

While the advantages of supplying the feeding infant with a food composition suitable for promoting the growth of L. bifidus as the predominating microorganism in the infant colon has been appreciated for some time, it has not been possible to attain this with any of the presently available food compositions wherein the growth promoting factor, on an average, has been present only to the extent of approximately 1.67% of the amount in which it is present in human milk as compared on an equal volume basis. From time to time thought has been directed to the possibility of adding to infant food composition some material or substance which would supply the L. bifidus growth promoting factor in greater amount, so that this growth promoting factor could be present in the infant's nourishment to an extent sufficient to insure the predominance of the microorganism L. bifidus in his intestinal tract. Unfortunately, however, no substance other than human milk has been known to contain the growth promoting factor in sufficiently high concentration to permit the enhancement of the growth promoting factor content to an extent adequate to insure this result with the presently available commercial preparations, and human milk, of course, is not a practical additive to such formulas.

We have now discovered that the growth promoting factor necessary to support the growth of *Lactobacillus bifidus* in the infant intestinal tract, or necessary, at least, to support the growth of those strains of the microorganisms which have been hitherto known to grow only in the presence of small quantities of human milk, or the growth promoting factor contained therein, or large quantities of cow's milk, is also present in considerable amounts in a commercially available product known as hog gastric mucin. We have further discovered that media containing hog gastric mucin (but no human milk, or growth promoting factor derived therefrom and no large quantities of cow's milk) will serve equally well as a source of the L. bifidus growth factor necessary to support growth of the microorganism in the infant colon. Infants fed with such media containing hog gastric mucin show an increase in the L. bifidus concentration in their feces and a decrease in gram negative organisms.

Hog gastric mucin, derived industrially from the gastric mucosa and juice of swine, is a product containing glycoproteins as its chief or active constituent. It contains mostly complex mucopolysaccharides including: a neutral polysaccharide containing acetylglucosamine and galactose in the ratio of 1:1; an acid mucopolysaccharide containing acetylglucosamine, sulfuric acid and an undetermined uronic acid; and blood group A substance of gastric mucosa which is a combination of protein and neutral polysaccharide. All these components have high molecular weights, ranging perhaps from 100,000 to 500,000. See Karl Meyer: "Advances in Protein Chemistry," vol. II (Academic Press, Inc., New York, 1945).

Commercially available hog gastric mucin is prepared by aqueous extraction of hog mucosa, followed by precipitation with organic solvents. It is soluble in water, insoluble in alcohol, and forms, in water, a viscous solution. Hog gastric mucin secured from various commercial sources is satisfactory.

We have found that the amount of hog gastric mucin which should be incorporated in an infant feeding formula or composition based on or derived from cow's milk of the general type previously described may range from 0.5% to 5.0% by weight, this percentage being on the total weight of the solids present in the infant feeding formula or composition. Frequently an amount of hog gastric mucin not exceeding about 1.0% will be found satisfactory for many purposes in infant feeding. The addition of hog gastric mucin to the infant feeding formula in amounts within the range 0.5% to 5% by weight thereof, based on the solids content basis supplements the small amount of L. bifidus growth promoting factor already present in that composition as a result of its cow's milk content so that the quantity of the growth promoting principle, as supplemented, is approximately comparable with the amount occurring, on the average, in an equal volume of human or breast milk. When the infant is fed with this composition or formula, the protein content thereof being derived from cow's milk, this food being supplemented, however, as to its growth promoting factor for L. bifidus by the addition of hog gastric mucin, all strains or variants of the L. bifidus microorganism present in the infant's intestinal tract have available for their growth in the infant colon a source of nutriment which is, as respects the amount of L. bifidus growth principle, substantially the same as human milk. The L. bifidus microorganism is thus enabled to grow and proliferate in the intestinal tract of the infant fed with the food composition based on milk but supplemented by the addition of hog gastric mucin, to the same extent and degree that it would were the infant nourished on human milk.

While we prefer to add to food compositions based on milk as utilized for infant feeding amounts of hog gastric mucin ranging from approximately 0.5% to 5%, based on the solid content of those compositions, the quantity of hog gastric mucin which need be added to secure satisfactory supplementation of the L. bifidus growth promoting factor is not unduly critical within wide limits. The amount of added mucin may therefore vary over a considerable range. Apparently the presence of only a very small amount of hog gastric nucin is sufficient to increase the content of L. bifidus growth promoting factor in the food composition to a very appreciable extent, and it is possible to utilize, of course, infant food compositions containing hog gastric mucin in which the growth promoting principle is present in concentrations somewhat below that in which it occurs in human milk.

In order to illustrate the effect of the addition of small amounts of hog gastric mucin to media otherwise sufficient as to their nutritional requirements for growth and proliferation of the L. bifidus microorganism, seven strains of this microorganism were isolated from infant feces, these strains being identified as Nos. 7, 17, 19, 54, 56, 76 and 97.

A standard culture medium for L. bifidus of a modified Teply-Elvehjem type was prepared, this medium containing the following constituents in substantially the amounts specified, per liter of culture medium:

| | | |
|---|---|---|
| Potassium acid phosphate ($K_2HPO_4$) | grams | 5 |
| Lactose | do | 70 |
| Sodium acetate (anhydrous) | do | 50 |
| Enzyme-hydrolyzed casein (casein hydrolyzed by enzymatic action) | do | 10 |
| Adenine | milligrams | 20 |
| Guanine | do | 20 |
| Uracil | do | 20 |
| Xanthine | do | 20 |
| Desoxyribonucleic acid | do | 200 |
| Alanine | do | 400 |
| Cystine | do | 400 |
| Tryptophane | do | 400 |

| | | |
|---|---|---|
| Asparagine | milligrams | 200 |
| "Tween" 80 (wetting agent) | do | 200 |
| Thiamine (hydrochloride) | micrograms | 400 |
| Riboflavin | do | 400 |
| Nicotinic acid | do | 1200 |
| Calcium pantothenate | do | 800 |
| Pyridoxal | do | 400 |
| Pyridoxine (hydrochloride) | do | 2400 |
| Pyridoxamine | do | 400 |
| p-Aminobenzoic acid | do | 20 |
| Folic acid | do | 20 |
| Vitamin $B_{12}$ | do | 20 |
| Biotin | do | 8 |
| Mineral salts | | Trace |

The trace of mineral salts present included salts of magnesium, iron, sodium and manganese. These minerals were incorporated by the addition of magnesium sulfate, ferrous sulfate, manganese sulfate and sodium chloride in small amounts to the medium. The enzyme-hydrolyzed casein utilized was a commercially-available product sold by the Sheffield Farms Co. as "N-Z-Case." Apart from the *L. bifidus* growth promoting factor, which is present in considerable concentration in human milk, but only in minor and insignificant concentration in cow's milk, this medium contains all the nutriments, vitamins, minerals, etc. necessary for the growth and proliferation in vitro, of strains of the *L. bifidus* micro-organism.

The culture medium thus prepared was measured into culture tubes, 5 ml. per tube. To some of these culture tubes there was added skim human milk in the various amounts specified below; to others there were added small amounts of a commercially available infant feeding formula based on milk, these small amounts being specified below; and to the remaining tubes there were added this commercially available infant feeding formula containing hog gastric mucin, the hog gastric mucin being present in amounts equivalent to approximately four grams of mucin per quart of infant formula at the dilution at which it is ordinarily fed. The commercially available infant feeding formula utilized was one previously referred to herein as a well-known formula, containing approximately 1.5% of protein, 7.0% of carbohydrate and 3.5% of fat, as well as small amounts of minerals and ash. The volume in all the culture tubes was then made to 10 ml. with water and the tubes autoclaved.

After cooling, the tubes of each of the three groups were then further divided into seven groups and each separate group in every case, was inoculated in the usual manner with one of the seven strains of *L. bifidus* which had been isolated from infant feces. These inoculated cultures were then maintained under anaerobic conditions (oxygen content less than about from 2 to 4%) for a forty-hour incubation period at 37° C., and the strain of the *L. bifidus* microorganism allowed to grow and develop therein. At the end of forty hours anaerobic incubation, the growth of *L. bifidus* in the various culture media was estimated by titrating the acid produced by the bacterium during the incubation period.

The results obtained for each of the seven selected strains, and in each of the various culture media, are summarized in the following table. In each case the numerical values given for the titrated acid content, which serve as an index of the amount of growth of the bacterium, are specified in milliliters of 0.1 Normal acid.

*Table I*

| Culture Medium | Strain of *Lactobacillus bifidus* | | | | | | |
|---|---|---|---|---|---|---|---|
| | 7 | 17 | 19 | 54 | 56 | 76 | 97 |
| Modified Teply-Elvehjem containing: | | | | | | | |
| 0.025 ml. of skim human milk | 12.3 | 5.8 | 11.2 | 12.0 | 13.4 | 5.9 | 10.9 |
| 0.05 ml. skim human milk | 13.7 | 11.5 | 12.6 | 13.7 | 13.5 | 11.8 | 11.6 |
| 0.1 ml. skim human milk | 14.9 | 14.5 | 15.8 | 15.5 | 15.0 | 14.4 | 13.4 |
| 0.5 ml. skim human milk | 19.0 | 21.9 | 19.4 | 19.4 | 19.1 | 19.0 | 16.2 |
| Modified Teply-Elvehjem containing: | | | | | | | |
| 0.1 ml. commercial infant feeding formula | 2.6 | 1.4 | 3.7 | 3.1 | 6.6 | 1.1 | 1.9 |
| 0.5 ml. commercial infant feeding formula | 3.9 | 1.8 | 5.3 | 4.0 | 9.2 | 1.9 | 2.9 |
| 1.0 ml. commercial infant feeding formula | 6.6 | 2.3 | 7.1 | 5.7 | 10.4 | 2.7 | 3.9 |
| 4.0 ml. commercial infant feeding formula | 12.8 | 6.1 | 11.6 | 10.0 | 13.1 | 7.9 | 10.7 |
| Modified Teply-Elvehjem containing: | | | | | | | |
| 0.025 ml. commercial infant feeding formula and hog gastric mucin | 11.8 | 13.6 | 11.2 | 10.6 | 13.8 | 13.0 | 9.0 |
| 0.063 ml. commercial infant feeding formula and hog gastric mucin | 13.6 | 16.1 | 14.6 | 13.0 | 14.6 | 16.6 | 13.7 |
| 0.125 ml. commercial infant feeding formula and hog gastric mucin | 16.8 | 17.9 | 17.1 | 16.5 | 16.4 | 16.9 | 12.5 |
| 0.25 ml. commercial infant feeding formula and hog gastric mucin | 19.1 | 20.3 | 20.0 | 18.2 | 18.8 | 19.2 | 14.9 |

For comparative purposes the modified Tepley-Elvehjem culture medium in which no additive of any sort had been incorporated was inoculated with the same seven strains of *Lactobacillus bifidus* and incubated, under anaerobic conditions, for a similar forty-hour incubation period. The quantities of acid in amounts equivalent to 0.1 N milliliter, as titrated (these amounts being proportional to the extent of growth of the strain in that medium during the forty-hour incubation period), are given in the following table:

*Table II*

| | Strain of *Lactobacillus bifidus* | | | | | | |
|---|---|---|---|---|---|---|---|
| | 7 | 17 | 19 | 54 | 56 | 76 | 97 |
| Modified Teply-Elvehjem Medium of Composition Specified | 2.3 | 1.5 | 4.5 | 2.9 | 5.0 | 1.1 | 1.9 |

It is evident that when hog gastric mucin is added to a commercially-available infant feeding preparation, during the forty-hour incubation period the strains of the *L. bifidus* micro-organism all grew to approximately the same degree as in the Teply-Elvehjem medium containing human or breast milk. With all strains tested the growth per ml. added to the medium was considerably less when the culture medium contained the commercial infant formula without added hog gastric mucin.

It is signficant that while the incorporation of the specified amounts of the commercial infant feeding formula (without hog gastric mucin) increased somewhat the extent of growth of the *L. bifidus* strains (owing to the growth factor present in the cow's milk component), in all cases it was necessary also to incorporate hog gastric mucin if the growth of the *L. bifidus* strains was to be comparable with their growth when skim human milk was utilized to supply the growth promoting factor.

Various modifications of this invention will be apparent to those skilled in the art without departing from the spirit thereof, and it is therefore intended that our invention shall be limited only in accordance with the scope of the appended claims.

We claim:

1. A food product suitable for use in the feeding of infants which comprises a foodstuff capable of being ingested by an infant and, as an additive thereto, hog gastric mucin.

2. A food product suitable for infant feeding comprising cow's milk solids and hog gastric mucin.

3. A food product suitable for infant feeding comprising cow's milk and from 0.5% to 5.0% of hog gastric mucin, said percentages being by weight, based on the content of solids in said food product.

4. A food product suitable for infant feeding comprising cow's milk solids and approximately 1.0% of hog gastric mucin, said percentage being by weight, based on the total weight of solids in said food product.

5. A food product suitable for infant feeding which comprises an infant food, lacking in the L. bifidus growth promoting factor but otherwise nutritionally adequate, and hog gastric mucin.

6. A food product suitable for infant feeding which comprises an infant food, lacking in the L. bifidus growth promoting factor but otherwise nutritionally adequate, and hog gastric mucin present in an amount ranging from 0.5% to 5.0% by weight, based on the content of solids in said infant food.

7. As a new article of manufacture, an infant feeding composition comprising protein, carbohydrate, fats, and mineral constituents and, as a source of the L. bifidus growth promoting factor, a small amount of hog gastric mucin.

8. As a new article of manufacture, an infant feeding composition comprising protein, carbohydrate, fats, and mineral constituents and, as a source of the L. bifidus growth promoting factor, from 0.5% to 5.0% of hog gastric mucin, said percentage being by weight, based on the total solids content of said infant feeding composition.

9. An infant feeding composition containing approximately 1.5% of protein, 7.0% of carbohydrate, 3.5% of fat, 0.38% of ash, a small amount of a mineral constituent, and from 0.5% to 5.0% of hog gastric mucin, said percentage being by weight, based on the solids content of said infant feeding composition.

References Cited in the file of this patent

UNITED STATES PATENTS

| Number | Name | Date |
|---|---|---|
| 1,607,844 | Nielson | Nov. 23, 1926 |
| 2,374,407 | Block et al. | Apr. 24, 1945 |

OTHER REFERENCES

"The Enzymes," by Sumner et al., vol. 1, part 2, Academic Press, Inc., New York, 1951, pages 772, 785 and 790.

"The Role of Lysozyme in the Development of the Intestinal Flora of the New-Born Infant," by Rosenthal et al., reprinted from the Journal of Infectious Diseases, February 1931, vol. 48, pages 226–235, American Medical Association Press, 535 North Dearborn Street, Chicago, Illinois.